US010494972B2

(12) United States Patent
Collins et al.

(10) Patent No.: US 10,494,972 B2
(45) Date of Patent: Dec. 3, 2019

(54) SYSTEM AND METHOD FOR DIESEL EXHAUST FLUID INJECTOR CLEANING

(71) Applicant: Ford Global Technologies, LLC, Dearborn, MI (US)

(72) Inventors: James Smarr Collins, New Boston, MI (US); Robert James Merrell, Novi, MI (US); Jonathan Matthew Green, Southgate, MI (US); Matthew Hargis, Troy, MI (US); John Roberts, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/721,503

(22) Filed: Sep. 29, 2017

(65) Prior Publication Data

US 2018/0128142 A1    May 10, 2018

Related U.S. Application Data

(60) Provisional application No. 62/418,021, filed on Nov. 4, 2016.

(51) Int. Cl.
| | |
|---|---|
| *F01N 3/20* | (2006.01) |
| *F01N 11/00* | (2006.01) |
| *F02B 37/24* | (2006.01) |
| *F01N 9/00* | (2006.01) |

(52) U.S. Cl.
CPC ............ *F01N 3/208* (2013.01); *F01N 9/00* (2013.01); *F01N 11/002* (2013.01); *F02B 37/24* (2013.01); *F01N 2610/02* (2013.01); *F01N 2610/144* (2013.01); *F01N 2610/1493* (2013.01); *Y02A 50/2325* (2018.01); *Y02T 10/144* (2013.01); *Y02T 10/24* (2013.01); *Y02T 10/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,336,296 | B2* | 12/2012 | Nakatani | B01D 53/9495 60/285 |
| 8,919,108 | B2* | 12/2014 | Itoh | F01N 3/0253 60/286 |
| 9,145,808 | B2* | 9/2015 | Yokota | F01N 3/208 |
| 2010/0071349 | A1* | 3/2010 | Kitazawa | F01N 3/2066 60/277 |
| 2011/0107742 | A1* | 5/2011 | Igarashi | F01N 3/208 60/277 |
| 2014/0331645 | A1 | 11/2014 | Cole et al. | |
| 2017/0328258 | A1* | 11/2017 | Ichimasa | F02D 45/00 |

* cited by examiner

*Primary Examiner* — Binh Q Tran
(74) *Attorney, Agent, or Firm* — Geoffrey Brumbaugh; McCoy Russell LLP (57) ABSTRACT

Methods and systems are provided for cleaning a urea-clogged diesel exhaust fluid (DEF) injector included in a selective catalytic reduction (SCR) engine exhaust aftertreatment system. In one example, a method may include, responsive to a diagnostic code indicating a clogged DEF injector, operating an engine in a DEF injector cleaning mode comprising operating the engine at a high idle speed, activating a DEF pump to deliver a desired amount of DEF at a desired flowrate, and measuring a duty cycle of DEF pump activation during DEF delivery. Responsive to the duty cycle being greater than a threshold duty cycle for a duration, DEF flow restoration is indicated.

19 Claims, 4 Drawing Sheets

SYSTEM AND METHOD FOR DIESEL EXHAUST FLUID INJECTOR CLEANING

CROSS REFERENCE TO RELATED APPLICATION

The present application claims priority to U.S. Provisional Patent Application No. 62/418,021 entitled "System and Method for Diesel Exhaust Fluid Injector Cleaning," filed on Nov. 4, 2016. The entire contents of the above-referenced application are hereby incorporated by reference in its entirety for all purposes.

FIELD

The present description relates generally to engine exhaust after-treatment systems and methods.

BACKGROUND/SUMMARY

Diesel engines may include a selective catalytic reduction (SCR) system in an emission control system to reduce emissions of nitrogen oxides ($NO_x$) during engine operation. A reductant, such as diesel exhaust fluid (DEF), may be injected directly into an exhaust passage upstream of the SCR system through a specialized DEF injector in a DEF dosing system. In one example, the DEF is an aqueous urea solution. The injected urea solution mixes with exhaust gas and breaks down to provide ammonia ($NH_3$) in the exhaust stream. The ammonia then reacts with $NO_x$ in the exhaust at a catalyst to produce nitrogen gas ($N_2$) and water ($H_2O$).

However, the urea of the DEF is susceptible to dehydration and crystallization. Hot exhaust gases may heat the DEF, causing water to evaporate and leave behind solid urea in the form of urea crystals. For example, a diesel particulate filter (DPF) regeneration event that is terminated by the end of a vehicle trip (e.g., a key-off event) may be a source of urea crystallization, as opening the DEF injector to purge the DEF dosing system at the end of the vehicle trip may draw in hot exhaust from the DPF regeneration event. The resulting urea crystals can clog the DEF injector and prevent DEF delivery to the exhaust passage. As a result of the DEF injector clogging, $NO_x$ emissions will not be reduced, and an emissions warning lamp may be activated.

Various strategies have been developed to address DEF injector clogging. One example approach shown by Cole et al. in U.S. 20140331645 A1 includes activating a remediation mode upon an indication of a clogged DEF injector. The remediation mode includes starting a timer and increasing the temperature of the exhaust gas in an attempt to melt urea crystals within the DEF injector. The DEF injector is then activated to evacuate any molten urea. Once a maximum remediation period has elapsed, a failure flag is set and the process is terminated.

However, the inventors herein have recognized potential issues with such systems. As one example, the method disclosed by Cole et al. is restricted to a finite duration once the clogged DEF injector is indicated. Depending on the vehicle operating status, it may not be possible to perform the remediation routine during that time period. Furthermore, raising the exhaust gas temperature may melt urea crystals within close proximity to or in direct contact with the exhaust gas flow but may not melt urea crystals that are not in close proximity to the exhaust gas. Thus, the DEF injector may remain clogged, the emissions warning lamp may remain activated, and additional repairs may be performed, increasing repair times and costs and increasing an amount of lost vehicle usage time.

In one example, the issues described above may be addressed by a method, comprising: while delivering diesel exhaust fluid (DEF) from a DEF dosing system to an exhaust passage of an engine via a DEF injector, indicating insufficient DEF injector flow in response to a duty cycle of a DEF pump being less than a first threshold duty cycle; and operating the engine in a DEF injector cleaning mode in response to the indication. In this way, the clogged DEF injector may be quickly cleaned without removing the injector from the vehicle.

As one example, operating the engine in the DEF injector cleaning mode includes operating the engine at a high idle speed, decreasing an amount of engine air intake flow (e.g., by decreasing an opening of an air intake throttle valve), and increasing an exhaust backpressure (e.g., by decreasing an opening of variable geometry turbine vanes). The engine may be operated in the DEF injector cleaning mode while servicing the vehicle, for example. Operating at the high idle speed with the decreased amount of intake air flow and the increased exhaust backpressure while servicing the vehicle warms the engine and enables the exhaust to reach normal operating temperatures (e.g., the temperatures reached when the vehicle is driven), thereby preventing SCR system degradation. By quickly cleaning the DEF injector while it remains in the vehicle, repair costs and loss of vehicle usage may be reduced compared with more time consuming cleaning procedures. As many diesel engines are used commercially (such as tractors used in interstate shipping), quick, cost-effective repairs may reduce company overhead.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
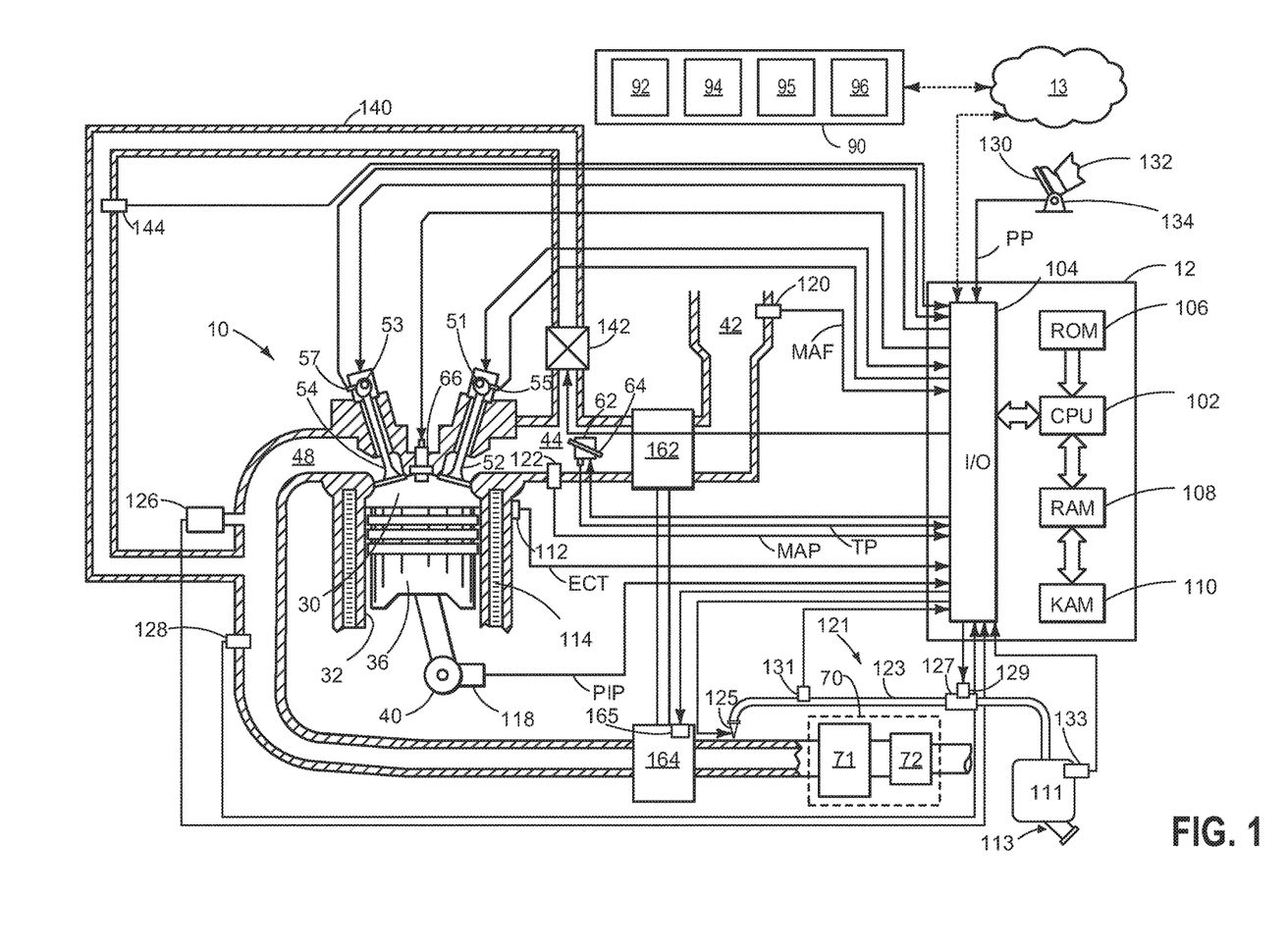
FIG. 1 shows a schematic diagram of an engine system with a selective catalytic reduction (SCR) system.

The following description relates to systems and methods for cleaning a clogged DEF injector included in an emission control system of an engine system, such as the engine system shown in FIG. 1. The clogged DEF injector may be identified according to the method of FIG. 3, for example. A software application may be installed on a computing system (e.g., a remote computing system in communication with a vehicle controller) to run vehicle system commands according to a DEF injector cleaning routine, such as the method of FIG. 2. FIG. 4 shows an example timeline for restoring flow to the clogged DEF injector using the DEF injector cleaning routine of FIG. 2.

FIG. 1 shows a schematic depiction of one cylinder 30 of a multi-cylinder engine 10, which may be included in a propulsion system of an automobile. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from an intake manifold 44 via an intake passage 42 and may exhaust combustion gases via an exhaust passage 48. Intake manifold 44 and exhaust passage 48 can selectively communicate with combustion chamber 30 via an intake valve 52 and an exhaust valve 54, respectively. In some embodiments, combustion chamber 30 may include two or more intake valves and/or two or more exhaust valves. In the present example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation, including CPS and/or VCT systems.

Fuel injector 66 is shown coupled directly to combustion chamber 30 for injecting fuel directly therein. Fuel injection may be via a common rail system or other such diesel fuel injection system. Fuel may be delivered to fuel injector 66 by a high pressure fuel system (not shown) including a fuel tank, a fuel pump, and a fuel rail.

Intake passage 42 may include an air intake throttle valve 62 having a throttle plate 64. In this particular example, the position of throttle plate 64 may be varied by controller 12 via a signal provided to an electric motor or actuator included with air intake throttle valve 62, a configuration that is commonly referred to as electronic throttle control (ETC). In this manner, air intake throttle valve 62 may be operated to vary the intake air provided to combustion chamber 30, among other engine cylinders. The position of throttle plate 64 may be provided to controller 12 by throttle position signal TP. Intake passage 42 may further include a mass air flow (MAF) sensor 120 and a manifold air pressure (MAP) sensor 122 for providing respective signals MAF and MAP to controller 12.

Further, in some examples, an exhaust gas recirculation (EGR) system may route a desired portion of exhaust gas from exhaust passage 48 to intake manifold 44 via an EGR passage 140. The amount of EGR provided to intake manifold 44 may be varied by controller 12 via an EGR valve 142. Further, an EGR sensor 144 may be arranged within EGR passage 140 and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature), and the crank speed sensor. Further, the EGR may be controlled based on an exhaust $O_2$ sensor and/or an intake oxygen sensor. Under some conditions, the EGR system may be used to regulate the temperature of the air and fuel mixture within the combustion chamber. While FIG. 1 shows a high pressure EGR system, additionally or alternatively, a low pressure EGR system may be used where EGR is routed from downstream of a turbine of a turbocharger to upstream of a compressor of the turbocharger. In some examples, however, the engine system may not include an EGR system.

Engine 10 may further include a compression device, such as a turbocharger or a supercharger, including at least one compressor 162 arranged along intake manifold 44. When the compression device is a turbocharger, compressor 162 may be at least partially driven by a turbine 164 (e.g., via a shaft) arranged along exhaust passage 48. Furthermore, the turbocharger may be a variable geometry turbocharger (VGT), where turbine geometry is actively varied by actuating vanes 165 as a function of engine speed and other operating conditions. In one example, vanes 165 may be coupled to an annular ring, and the ring may be rotated. In another example, one or more of the vanes 165 may be pivoted individually or pivoted in plurality. When the compression device is a supercharger, compressor 162 may be at least partially driven by the engine and/or an electric machine and may not include a turbine. Thus, the amount of compression provided to one or more cylinders of the engine via the compression device may be varied by controller 12. In the example shown in FIG. 1, the compression device is a turbocharger. However, in some examples, engine 10 may not include a turbocharger but may instead be a normally aspirated engine.

An exhaust gas sensor 126 and an exhaust gas temperature sensor 128 are shown coupled to exhaust passage 48 upstream of an emission control system 70. Exhaust gas sensor 126 may be any suitable sensor for providing an indication of exhaust gas air/fuel ratio, such as a linear universal or wide-range exhaust gas oxygen sensor (UEGO), a two-state oxygen sensor (EGO), a heated EGO (HEGO), a $NO_x$, a HC, or a CO sensor.

Emission control system 70 is shown arranged along exhaust passage 48 downstream of exhaust gas sensor 126. Emission control system 70 may include a selective catalytic reduction (SCR) system, a three way catalyst (TWC), a $NO_x$ trap, various other emission control devices, or combinations thereof. For example, emission control system 70 may be an exhaust after-treatment system that includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst. The DPF may be thermally regenerated periodically during engine operation. Further, in some embodiments, during operation of engine 10, emission control system 70 may be periodically reset by operating at least one cylinder of the engine within a particular air/fuel ratio.

Engine exhaust systems may use various injections of a reductant to assist in the reaction of various exhaust gas components. For example, a reductant injection system may be provided to inject a suitable reductant, such as DEF, to SCR catalyst 71. However, various alternative approaches may be used, such as solid urea pellets that generate an ammonia vapor, which is then injected or metered to SCR catalyst 71. In still another example, a lean $NO_x$ trap may be positioned upstream of SCR catalyst 71 to generate ammonia for the SCR catalyst, depending on the degree of richness of the air-fuel ratio fed to the lean $NO_x$ trap. As yet another example, a lean $NO_x$ trap may be positioned upstream or downstream of SCR catalyst 71, and a urea source may be used to provide ammonia for the SCR catalyst. In still another example, a passive $NO_x$ adsorber may be may be positioned upstream or downstream of SCR catalyst 71, and a urea source may be used to provide ammonia for the SCR catalyst.

The exhaust system may further include a reductant delivery and/or storage system, such as DEF dosing system 121. As noted herein, the DEF may be a liquid reductant, such as an aqueous urea solution, stored in a storage vessel, such as a storage tank. In one example, the DEF dosing system 121 may include DEF tank 111 for onboard DEF storage and a DEF delivery line 123 that couples the DEF tank to the exhaust passage via a DEF injector 125 at or upstream of SCR catalyst 71. The DEF tank 111 may be of various forms and may include a fill neck 113 and a corresponding cap and/or cover door in the vehicle body. Fill neck 113 may be configured to receive a nozzle for replenishing DEF. Further, a DEF temperature sensor 133 may be coupled to DEF tank 111 to provide an indication of DEF temperature.

DEF injector 125 in DEF delivery line 123 injects DEF into the exhaust upstream of SCR catalyst 71. Controller 12 may use DEF injector 125 to control the timing and amount of DEF injections. DEF dosing system 121 may further include a DEF pump 127. DEF pump 127 may be used to pressurize and deliver DEF into the DEF delivery line 123. A pressure sensor 131 coupled to DEF delivery line 123 upstream of DEF pump 127 and downstream of DEF injector 125 may be included in DEF dosing system 121 to provide an indication of DEF delivery pressure. Further, DEF pump 127 may include a reverting valve 129 that, when actuated (e.g., energized), reverses a pumping direction of DEF pump 127. For example, actuating reverting valve 129 may reverse a flow of DEF through DEF delivery line 123 so that DEF flows from DEF injector 125 to DEF tank 111.

Further, one or more sensors, e.g., pressure, temperature, and/or $NO_x$ sensors, may be included in the engine exhaust and/or in emission control system 70 to monitor parameters associated with devices included in the emission control system. For example, one or more sensors may be used to determine an amount of ammonia stored in SCR catalyst 71 based on a temperature of the catalyst, exhaust gas sensor readings, amount of reductant injected into the SCR catalyst, etc.

Controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 in addition to those signals previously discussed, including a measurement of inducted mass air flow (MAF) from MAF sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and an absolute manifold pressure signal, MAP, from MAP sensor 122. An engine speed signal, RPM, may be generated by controller 12 from signal PIP. Manifold pressure signal MAP from MAP sensor 122 may be used to provide an indication of vacuum or pressure in the intake manifold. In one example, Hall effect sensor 118, which is also used as an engine speed sensor, may produce a predetermined number of equally spaced pulses every revolution of the crankshaft. Storage medium read-only memory 106 can be programmed with computer readable data representing instructions executable by processor 102 for performing the methods described below as well as other variants that are anticipated but not specifically listed.

Controller 12 may be communicatively coupled to an off-board remote computing device 90 via a wireless network 13, which may comprise Wi-Fi, Bluetooth, a type of cellular service, a wireless data transfer protocol, and so on. The remote computing device 90 may comprise, for example, a processor 92 for executing instructions, a memory 94 for storing said instructions, a user interface 95 for enabling user input (e.g., a keyboard, a touch screen, a mouse, a microphone, a camera, etc.), and a display 96 for displaying graphical information. As such, the remote computing device 90 may comprise any suitable computing device, including a personal computer (such as a desktop computer, a laptop, a tablet, etc.), a smart device (such as a smart phone, etc.), and so on. As described further herein and with regard to FIG. 2, the control system 12 may be configured to transmit and receive information regarding the status of the DEF dosing system 121 (as well as other engine operating conditions, such as engine speed) to and from remote computing device 90, which may in turn display the information via display 96. As will be described in further detail in FIG. 2, such information may be utilized to communicate with a service technician to coordinate DEF injector cleaning.

As described above, FIG. 1 shows only one cylinder of a multi-cylinder engine, and each cylinder may similarly include its own set of intake/exhaust valves, fuel injector, etc.

Figure 2:
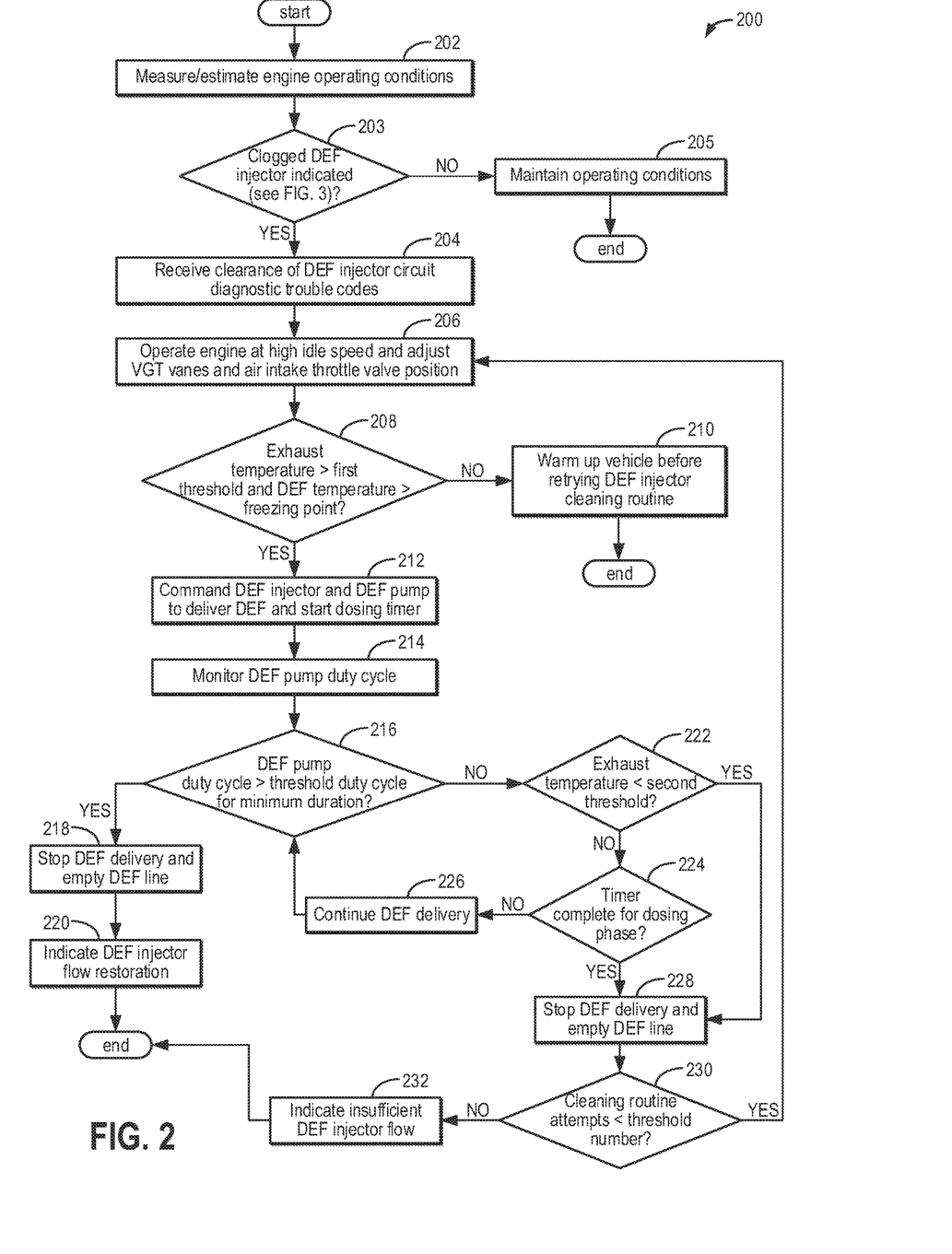
FIG. 2 is a flowchart of an example method for a software application for DEF injector cleaning.

Turning now to FIG. 2, a high-level flowchart of an example method 200 for cleaning a urea-clogged DEF injector is shown. More specifically, method 200 may comprise a software application (app) for enabling a service technician (e.g., a user) to run engine system commands via a computing device comprising, for example, a remote computing device (e.g., remote computing device 90 of FIG. 1) or a control system of the vehicle (e.g., controller 12 of FIG. 1). Such an application may be enabled in response to a diagnostic trouble code indicating a clogged DEF injector (such as DEF injector 125 of FIG. 1) in order to perform a DEF injector cleaning routine, such as by operating the engine system in a DEF injector cleaning mode while at idle. Method 200 will be described with reference to the systems described herein and shown in FIG. 1, although it should be understood that similar methods may be applied to other systems without departing from the scope of this disclosure.

Parts of method 200 may be carried out by a controller, such as controller 12 of FIG. 1. The parts of method 200 that are carried out by the controller may be stored at the controller as executable instructions in non-transitory memory, where such parts of method 200 are enabled based on user input to the app and/or programmed instructions of the app. Parts of method 200 carried out by the controller include instructions that are executed by the controller based on instructions stored on a memory of the controller and in conjunction with signals received from sensors of the various vehicle systems, such as sensors described above with reference to FIG. 1 (e.g., pressure sensor 131). Based on user input and instructions of the app, the controller may employ engine and emission control system actuators (e.g., air intake throttle valve 62, VGT vanes 165, DEF pump 127, and DEF injector 125 of FIG. 1) to adjust engine operation, such as by transitioning to the DEF injector cleaning mode, according to the method described below.

Method 200 begins at 202 and includes measuring and/or estimating engine operating conditions. Conditions assessed may include, for example, engine load, engine speed, manifold air flow and air pressure, throttle position, exhaust pressure, exhaust temperature, etc. Operating conditions may be measured by one or more sensors communicatively coupled to a controller or may be inferred based on available data. As an example, the engine may be operated at idle at 202.

At 203, it is determined if a clogged DEF injector is indicated. For example, a diagnostic trouble code (DTC) indicating a clogged DEF injector may be stored on a memory of the controller (e.g., in non-transitory memory). The controller may determine that the DEF injector is clogged and set the corresponding DTC according to the method of FIG. 3, for example, as will be described below.

If a clogged DEF injector is not indicated, such as when no corresponding DTC is stored in a memory of the controller, method 200 proceeds to 205 and includes maintaining operating conditions. For example, the DEF injector will not be cleaned and may continue to deliver DEF as commanded. Following 205, method 200 ends.

If a clogged DEF injector is indicated at 203, such as by the presence of a corresponding DTC, method 200 proceeds to 204 and includes receiving clearance of DEF injector circuit DTCs. For example, the DEF injector circuit DTCs may be cleared by the service technician. In another example, the controller may clear the DEF injector circuit DTCs. The DEF injector circuit DTCs may include (but are not limited to) an indication of insufficient DEF injector flow (e.g., a clogged DEF injector). Thus, receiving clearance of the DEF injector circuit DTCs may serve as a request to transition the engine to operating in the DEF injector cleaning mode.

After the codes are cleared, method 200 proceeds to 206 and includes operating the engine at a high idle speed and adjusting a VGT vane position of a turbocharger and an air intake throttle valve position. For example, the engine idle speed may be increased to a predetermined speed (e.g., a cleaning idle speed), such as 1500 RPM, that is higher than the engine idle speed outside of the DEF injector cleaning mode (e.g., when method 200 is not executed). The VGT vanes may be adjusted from a first vane position, which may correspond to a VGT vane position during engine idle outside of the DEF injector cleaning mode, to a second, further closed (e.g., less open) vane position. As a non-limiting example, the VGT vanes may be commanded to 80% of the fully closed position. The air intake throttle valve may be adjusted from a first air intake throttle valve position, which may correspond to an air intake throttle valve position during engine idle outside of the DEF injector cleaning mode, to a second, further closed (e.g., less open) air intake throttle valve position. As a non-limiting example, the air intake throttle valve may be commanded to 80% of the fully closed position. Furthermore, transmission shifting may be prevented, even if requested by a vehicle operator, due to the impact of the higher idle speed on the transmission. By running the engine at a high idle speed, the engine temperature may be raised. Operating the engine with the air intake throttle valve further closed decreases the engine air intake flow while operating in the DEF injector cleaning mode compared to the amount of engine air intake flow while operating at idle outside of the DEF injector cleaning mode for an equivalent ambient temperature and engine temperature, which further increases the exhaust temperature. Furthermore, operating with the VGT vanes further closed increases a velocity of exhaust gas traveling through the turbocharger, thereby providing a greater amount of boost than when the VGT vanes are in a more open position during idle operation outside of the DEF injector cleaning mode for the equivalent ambient temperature and engine temperature, and increases an exhaust backpressure, which further increases the exhaust temperature. The increased exhaust temperature may raise the temperature of the SCR catalyst to a level where urea in the DEF will not cause degradation, as a cold SCR catalyst may be poisoned by urea injection.

At 208, it is determined if the exhaust temperature is greater than a first threshold temperature and the DEF temperature is greater than the DEF freezing point. The exhaust temperature may be measured by an exhaust gas temperature sensor (e.g., exhaust gas temperature sensor 128 of FIG. 1). For example, the first threshold temperature may be an exhaust temperature above which the SCR catalyst is expected to remain hot enough to avoid catalyst poisoning by the urea injection throughout the DEF injector cleaning process. In one non-limiting example, the first threshold exhaust temperature is 200° C. but may be adjusted with a calibration file. The DEF temperature may be measured by a temperature sensor in the DEF tank (such as DEF temperature sensor 133 of FIG. 1), for example. The DEF freezing point is the temperature above which DEF exists as a liquid and below which DEF exists as a solid (e.g., approximately −11° C.). In another example, it may be determined if the DEF temperature is greater than a threshold DEF temperature, which may be equal to the DEF freezing point or may be greater than the DEF freezing point.

If the exhaust temperature is not greater than the first threshold temperature and/or if the DEF temperature is not above the freezing point (or the threshold DEF temperature), the method proceeds to 210 and includes warming up the vehicle before retrying the DEF injector cleaning routine. For example, the engine may continue to be operated at the high idle speed. Alternatively, the vehicle may be driven in order to expedite engine and DEF warming. The amount of driving required to thaw the DEF tank, for example, may vary based on the amount of frozen material in the tank, with the amount of driving increasing as the amount of frozen material increases. Following 210, method 200 ends.

Returning to 208, if the exhaust temperature is greater than the first threshold and the DEF temperature is greater than the freezing point (or the threshold DEF temperature), the method proceeds to 212 and includes commanding the DEF injector and DEF pump to deliver DEF and starting a first dosing timer (e.g., for a DEF dosing phase). For example, voltage (e.g., 12 V) may be supplied to the DEF pump (such as DEF pump 127 of FIG. 1) at a duty cycle determined based on calibrations specified by the app to deliver a desired amount of DEF (e.g., 25 grams) at a desired flow rate (e.g., 400 mg/s). Furthermore, the duty cycle of DEF pump activation may be varied in order to achieve a target DEF delivery pressure, with the DEF delivery pressure measured using a DEF dosing system pressure sensor (e.g., pressure sensor 131 of FIG. 1). When the target delivery pressure is achieved and stabilized, the DEF injector may be actuated to an open position in order to inject the DEF. The first dosing timer may be started in order to measure a duration of DEF delivery, as will be described in further detail below. For example, the first dosing timer may be set for a first duration in the range of 1-3 minutes (e.g., 1.2 minutes).

At 214, the method includes monitoring the DEF pump duty cycle (e.g., the duty cycle of DEF pump activation). The DEF pump duty cycle provides an indication of an extent of DEF injector clogging; as the extent of DEF injector clogging increases, the DEF pump duty cycle decreases. For example, if no DEF is flowing due to a clogged DEF injector, a low commanded DEF pump duty cycle is able to maintain the target DEF delivery pressure. Once the DEF begins flowing through the DEF injector, the commanded DEF pump duty cycle will increase in order to maintain the target DEF delivery pressure. The change in pump duty cycle may be used to identify injector no flow and normal flow conditions, as will be further described below. Alternatively, the DEF delivery pressure and volume may be monitored and compared to calibrated flow values representative of a nominal DEF injector.

At 216, it is determined if the DEF pump duty cycle is greater than a threshold duty cycle for a minimum duration. That is, it is determined if DEF pump operation is maintained at a pump duty cycle greater than the threshold duty cycle for the entirety of the minimum duration. For example, the pump duty cycle percentage may range from 24-35% during normal DEF flow (e.g., when the DEF injector is not clogged), and so the threshold duty cycle may be 23%. Once the duty cycle reaches the threshold duty cycle, a second timer may be started and set for a second duration (e.g., the minimum duration). If the pump duty cycle drops below the threshold duty cycle, the second timer may be set to zero and restarted if the DEF pump duty cycle again exceeds the threshold duty cycle. In one non-limiting example, the minimum duration is 30 seconds. Additionally or alternatively, at 216, it may be determined if the DEF pump delivery pressure is greater than a threshold delivery pressure and a volume of DEF delivered is greater than a threshold volume. At 216, the method may also include displaying system parameters (e.g., DEF pump duty cycle percentage, DEF pump delivery pressure, and engine exhaust temperature) to the service technician via a display device (such as display 96 of FIG. 1, for example).

If the DEF pump duty cycle is greater than the threshold duty cycle for the minimum duration, the method proceeds to 218 and includes stopping DEF delivery and emptying the DEF line. For example, the amount of voltage supplied to the DEF pump may be reduced to 0 V, and thus, pressurized DEF will not be delivered to the DEF injector. Furthermore, the engine idle speed may be reduced to the normal engine idle speed of the vehicle (e.g., the idle speed of the engine outside of the DEF injector cleaning mode, such as responsive to engine start and without additional engine idle speed commands), and the VGT vanes and air intake throttle valve may be returned to their original (e.g., first) positions. The DEF line may be emptied, for example, by activating a purge cycle. When the purge cycle is requested, the DEF injector may be actuated to the open position and the DEF pump may be activated with a reverting valve commanded (e.g., reverting valve 129 of FIG. 1). When the reverting valve is commanded (e.g., energized), the flow of DEF through the DEF pump is reversed, creating a vacuum within the DEF dosing system that draws DEF from the DEF line and the DEF injector and back into the DEF tank. Once the purge cycle is finished (e.g., after the DEF pump is activated with the reverting valve commanded for a duration, with the duration determined based on a calibration of the app), the DEF injector is closed and the reverting valve is returned to an unenergized state. Applying vacuum to the DEF dosing system may loosen remaining stuck urea crystals in the DEF injector. The remaining crystals may then be re-dissolved by priming the DEF dosing system with fresh DEF.

At 220, the method includes indicating DEF injector flow restoration. For example, a message indicating DEF injector flow restoration may be displayed to the service technician. The message may further include instructions to continue a repair procedure according to a service manual. In another example, indicating DEF injector flow restoration may include storing the indication in a memory of the controller. Further, DEF delivery may be enabled responsive to demand, as described with respect to FIG. 3. Following 220, method 200 ends.

Returning to 216, if the DEF pump duty cycle is not greater than the threshold duty cycle for the minimum duration, the method proceeds to 222 and includes determining if the exhaust temperature is less than a second threshold temperature. The second threshold temperature may refer to an exhaust temperature below which the exhaust may not be able to heat the SCR catalyst enough to prevent poisoning of the SCR catalyst by urea. For example, the second threshold temperature may be in the range of 185-195° C. (e.g., 190° C.).

If the exhaust temperature is not less than the second exhaust threshold temperature, the method proceeds to 224 and includes determining if the first dosing timer is complete for the DEF dosing phase (as started at 212). In one example, the first dosing timer may be complete if it counts down from the set duration (e.g., 1.2 minutes) and reaches zero. In another example, the first dosing timer may be complete if it counts up from zero and reaches the set duration. Thus, the first dosing timer may be complete once the first duration elapses.

If the DEF dosing phase timer (e.g., the first dosing timer) is not complete at 224, the method proceeds to 226 and includes continuing DEF delivery. For example, the DEF pump may remain active, with a non-zero voltage supplied at a non-zero duty cycle, in order to continue to supply the DEF at the desired flow rate and the target DEF delivery pressure, and the DEF injector actuated open to inject the DEF once the target delivery pressure is achieved and stabilized. Following 226, the method returns to 216 and includes determining if the DEF pump duty cycle is greater than a threshold duty cycle for the minimum duration, as described above. If instead, at 224, the DEF dosing phase timer is complete, the method proceeds to 228 and includes stopping DEF delivery and emptying the DEF line. DEF delivery may be stopped and the DEF line may be emptied and subsequently primed as described previously at 218.

Returning to 222, if the exhaust temperature is less than the second exhaust threshold temperature, the method proceeds to 228 and includes stopping DEF delivery and emptying the DEF line, as described above.

At 230, method 200 includes determining if the number of cleaning routine attempts is less than a threshold number. For example, the app may track the number of times the DEF line has been emptied (as at 228) or the number of times the first dosing timer has elapsed as an indication of the number of times the routine has been performed. The threshold number may be a non-zero, calibratable value, such as four, above which continued attempts at DEF injector cleaning using method 200 are not expected to restore injector flow. If the number of cleaning routine attempts (e.g., the number of times the DEF line has been emptied during method 200) is not less than the threshold number (e.g., it is equal to the threshold number), the method includes indicating insufficient DEF injector flow at 232. That is, the DEF injector is unable to be cleaned using method 200 and the DEF injector cleaning mode. Indicating insufficient DEF injector flow may include setting a corresponding DTC at the controller and/or generating a display a message. The DTC may indicate DEF injector degradation, for example, and may be stored in non-transitory memory of the controller. The display message may include further instructions for the service technician to continue DEF injector diagnosis as directed by the service manual. For example, the DEF injector may be removed from the vehicle and cleaned manually or may be replaced, as indicated. The method then ends.

Returning to 230, if the number of cleaning routine attempts is less than the threshold number, the method returns to 206 and includes running the engine at the high idle speed with the VGT vanes and air intake throttle valve at the second, further closed positions. Additionally, a message may be displayed to the service technician indicating the progress of the cleaning routine. For example, the message may state that the warmup process will be repeated to begin the next phase of the cleaning process. Thus, the cleaning routine may be repeated the threshold number times before insufficient DEF injector flow is indicated at 232 and the DEF injector cleaning mode is deemed unsuccessful for restoring flow to the DEF injector.

Figure 3:
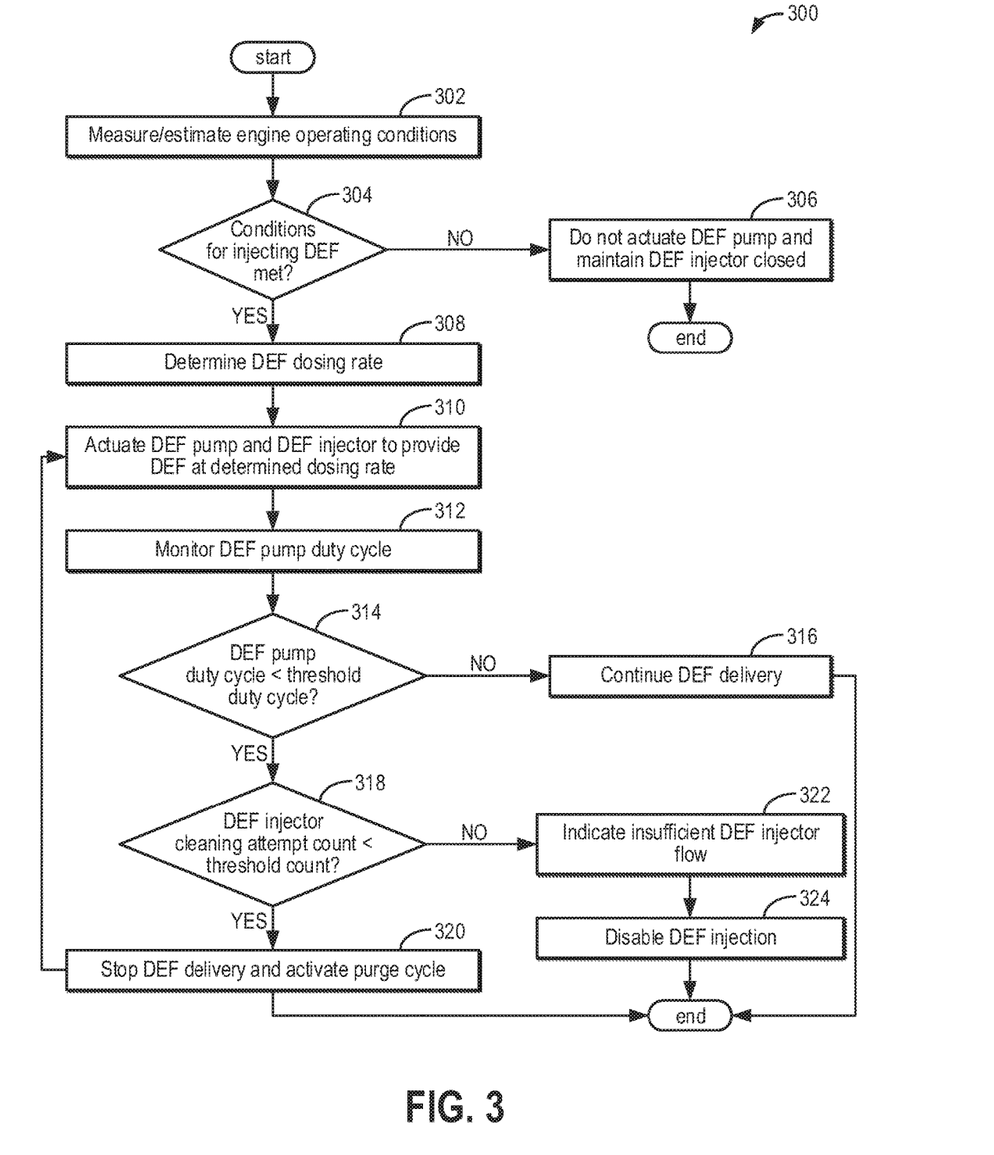
FIG. 3 is a flowchart of an example method for identifying a clogged DEF injector.
Figure 4:
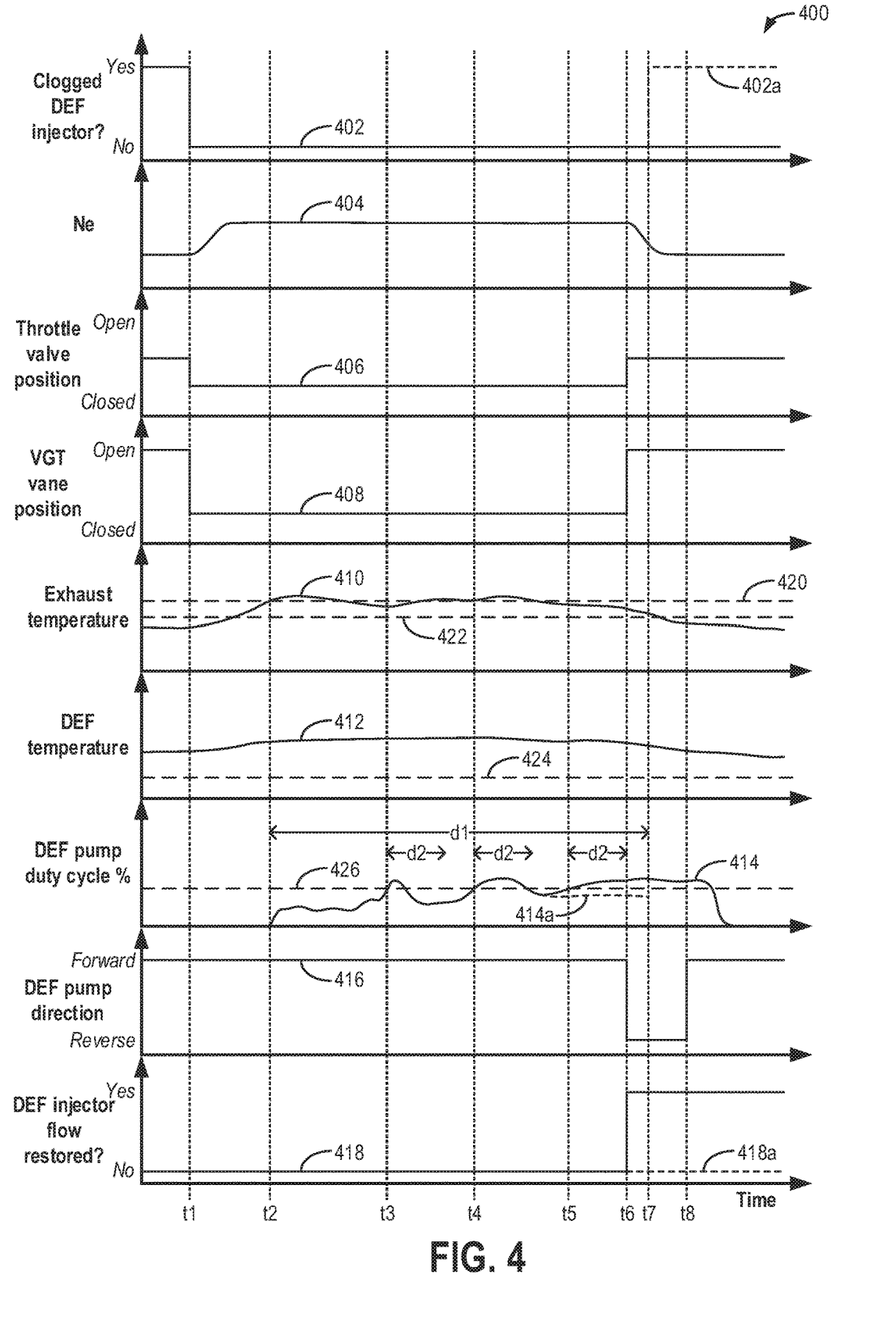
FIG. 4 is a prophetic example timeline for restoring flow to a clogged DEF injector while it remains in a vehicle.

Continuing to FIG. 3, an example method 300 for detecting a clogged DEF injector (such as DEF injector 125 of FIG. 1) in a DEF dosing system (e.g., DEF dosing system 121 of FIG. 1) of a vehicle is shown. Furthermore, method 300 includes attempting to clean the clogged injector prior to indicating insufficient DEF injector flow. Instructions for carrying out method 300 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., pressure sensor 131). The controller may employ engine actuators of the engine system (e.g., DEF pump 127 and DEF injector 125 of FIG. 1) to adjust engine operation according to the methods described below. If insufficient DEF injector flow is indicated according to method 300 of FIG. 3, the controller, in combination with a software app and input from a user (e.g., a service technician), may perform a DEF injector cleaning routine, such as according to method 200 of FIG. 2. For example, method 300 of FIG. 3 may include operating the engine in a first mode, and method 200 of FIG. 2 may include operating the engine in a second mode, which may be a DEF injector cleaning mode, as described with respect to FIG. 2.

Method 300 begins at 302 and includes measuring and/or estimating operating conditions. Conditions assessed may include, for example, engine load, engine speed, manifold air flow and air pressure, throttle position, ambient temperature, exhaust pressure, exhaust temperature, an amount of ammonia stored in a SCR catalyst, etc. Operating conditions may be measured by one or more sensors communicatively coupled to the controller or may be inferred based on available data. For example, as described with respect to FIG. 1, one or more sensors may be used to determine the amount of ammonia stored in the SCR catalyst, such as based on a temperature of the SCR catalyst (as measured by a temperature sensor), exhaust gas sensor readings (e.g., concentration of $NO_x$ measured by a $NO_x$ sensor), an amount of reductant injected into the SCR catalyst, etc. The controller may input at least one of the temperature of the SCR catalyst, the concentration of $NO_x$, and the amount of reductant injected into the SCR catalyst into a look-up table, algorithm, or equation and output the amount of ammonia stored in the SCR catalyst, in one example.

At 304, it is determined if conditions for injecting DEF are met. For example, conditions for injecting DEF may include at least one of the amount of ammonia stored in the SCR catalyst (e.g., SCR catalyst 71 of FIG. 1) being less than a threshold amount, the engine speed being greater than a threshold speed, and the concentration of $NO_x$ in the exhaust being greater than a threshold concentration. The threshold amount may refer to an amount of stored ammonia below which there may be insufficient ammonia available for $NO_x$ reduction upon a vehicle start, for example. The threshold speed may refer to an engine speed below which it may be difficult to accurately deliver DEF at a low flow rate corresponding to the low engine (and $NO_x$) output. The threshold concentration may refer to a concentration of $NO_x$ above which further $NO_x$ reduction may be indicated in order to remain within vehicle $NO_x$ emissions regulations.

If conditions for injecting DEF are not met, method 300 proceeds to 306 and includes not actuating a DEF pump and maintaining the DEF injector closed. With the DEF pump (e.g., DEF pump 127 of FIG. 1) not activated, DEF will not be pumped from a DEF tank of the delivery system (e.g., DEF tank 111 of FIG. 1) to the DEF injector. With the DEF injector remaining closed, DEF will not be injected into the exhaust upstream of the SCR catalyst. Following 306, method 300 ends.

Returning to 304, if conditions for injecting DEF are met, such as when at least one of the amount of ammonia stored in the SCR catalyst is less than the threshold amount, the engine speed is greater than the threshold speed, and the concentration of $NO_x$ is greater than the threshold concentration, method 300 proceeds to 308 and includes determining a DEF dosing rate. For example, the DEF dosing rate may be determined based on a current exhaust $NO_x$ level, the ambient temperature, the exhaust temperature, an amount of fuel injected into engine cylinders, etc. In one example, the controller may input at least one of the current exhaust $NO_x$ level, the ambient temperature, the exhaust temperature, and the amount of fuel injected into the engine cylinders into a look-up table, algorithm, or equation and output the DEF dosing rate. Thus, the DEF dosing rate may be updated as operating conditions change.

At 310, method 300 includes actuating the DEF pump and the DEF injector to provide DEF at the determined dosing rate. For example, voltage (e.g., 12 V) may be supplied to the DEF pump at a duty cycle determined based on calibrations stored in a memory of the controller to provide the determined DEF dosing rate. Furthermore, the duty cycle of DEF pump activation may be adjusted in order to achieve a target DEF delivery pressure, with the DEF delivery pressure measured using a DEF dosing system pressure sensor (e.g., pressure sensor 131 of FIG. 1). When the target delivery pressure is achieved and stabilized, the DEF injector may be actuated to an open position in order to inject the DEF.

At 312, method 300 includes monitoring the DEF pump duty cycle. Since the DEF pump duty cycle may be adjusted based on the DEF dosing system pressure, a decrease in DEF pump duty cycle may indicate that the DEF dosing system pressure is remaining high, such as when DEF flow is decreased due to a clogged DEF injector.

Therefore, at 314, it is determined if the DEF pump duty cycle is less than a threshold duty cycle. The threshold duty cycle may be a non-zero value below which it may be inferred that DEF is not flowing out of the DEF injector as commanded, such as when the DEF injector is degraded. When the DEF dosing rate is low, the DEF pump duty cycle may be lower than when the DEF dosing rate is high. Therefore, the threshold duty cycle may be determined based on the desired DEF dosing rate, with the threshold duty cycle increasing as the desired DEF dosing rate increases. The controller may input the DEF dosing rate into a look-up table and output the threshold duty cycle, for example.

If the DEF pump duty cycle is not less than the threshold duty cycle, method 300 proceeds to 316 and includes continuing DEF delivery. With the DEF pump duty cycle within a nominal duty cycle range for the given DEF dosing rate, it may be determined that the DEF injector is not clogged, and thus, DEF may continue to be delivered based on operating conditions, as described above. Following 316, method 300 ends.

Returning to 314, if the DEF pump duty cycle is less than the threshold duty cycle, method 300 proceeds to 318 and includes determining if a DEF injector cleaning attempt count is less than a threshold count. The threshold count may refer to a number of times the controller may attempt to clean the DEF injector and restore flow, such as by activating a purge cycle, as will be described below, before insufficient DEF injector flow is indicated and a more rigorous cleaning routine is needed, such as described with respect to FIG. 2. In some examples, the threshold count may be one (e.g., the controller may attempt to restore flow only once), but in other examples, the threshold count may be more than one. The threshold count may be changed with a calibration file, for example. Therefore, the controller may track the number of times the purge cycle is activated.

If the DEF injector cleaning attempt count is less than the threshold count, the controller may attempt to clean the DEF injector and restore DEF flow, with method 300 proceeding to 320 to stop DEF delivery and activate the purge cycle. For example, the amount of voltage supplied to the DEF pump may be reduced to 0 V, and thus, pressurized DEF may not be delivered to the DEF injector. When the purge cycle is requested, the DEF injector may be actuated to the open position and the DEF pump may be activated with a reverting valve commanded. When the reverting valve (e.g., reverting valve 129 of FIG. 1) is commanded (e.g., energized), the flow of DEF through the DEF pump is reversed, creating a vacuum within the DEF dosing system that draws DEF from the DEF line and the DEF injector back to the DEF tank. Once the purge cycle is finished (e.g., after the DEF pump is activated with the reverting valve commanded for a predetermined duration), the DEF injector may be closed and the reverting valve may be returned to an unenergized state. Applying vacuum to the DEF dosing system may loosen stuck urea crystals in the DEF injector. Method 300 may then return to 310 to actuate the DEF pump (without the reverting valve commanded) and the DEF injector to provide the DEF at the determined dosing rate. In this way, any urea crystals loosened by the purge cycle may be flushed out or re-dissolved. The controller may determine if the purge cycle was effective at cleaning the DEF injector by monitoring the DEF pump duty cycle at 312 and determining if the DEF pump duty cycle is greater than or equal to the threshold duty cycle at 314, as described above.

Returning to 318, if the DEF injector cleaning attempt count is not less than the threshold count, such as when the DEF injector cleaning attempt count is equal to the threshold count (e.g., the purge cycle has been activated a threshold number of times), method 300 proceeds to 322 and includes indicating insufficient DEF injector flow. For example, indicating insufficient DEF injector flow may include setting a corresponding DTC at the controller, such as by storing a DTC indicating DEF injector degradation in non-transitory memory. Indicating insufficient DEF injector flow may further include illuminating a malfunction indicator lamp (MIL), such as on a message display area or a dash of the vehicle, in order to alert a vehicle operator to service the vehicle. Illuminating the MIL may further include indicating a reason for the MIL.

At 324, method 300 includes disabling DEF injection. For example, the DEF pump may remain deactivated, with no voltage (e.g., 0 V) supplied to the DEF pump. Furthermore, the DEF injector may be kept in a closed position. As such, the controller may not attempt to deliver DEF even when conditions for injecting DEF are met (e.g., at 304) until the corresponding DEF injector circuit DTCs are cleared. Following 324, method 300 ends.

In this way, FIG. 3 provides a method for providing DEF to a vehicle exhaust via a DEF dosing system, detecting a clogged DEF injector, and attempting to clear the clog and restore injector flow before indicating insufficient DEF injector flow. By applying vacuum to the DEF line, stuck urea crystals in the DEF injector may be loosened and then flushed out when fresh DEF is supplied. Furthermore, fresh DEF may re-dissolve remaining urea crystals. If the less rigorous cleaning routine of FIG. 3 is successful at restoring DEF injector flow while the vehicle is in motion, the vehicle does not experience a DEF injector fault (e.g., no DEF injector DTC is set), and the more rigorous DEF injector cleaning routine of FIG. 2 is not performed.

Together, the methods of FIGS. 2-3 provide a method for diagnosing a degraded DEF injector in a DEF dosing system in a vehicle, such as a clogged DEF injector that cannot be cleared by simply applying vacuum within the DEF dosing system. In one example, the method may include determining insufficient DEF injector flow and in response thereto, storing a diagnostic code in non-transitory memory indicating a clogged DEF injector; and determining DEF injector flow restoration (which may be not insufficient DEF injector flow) and in response thereto, enabling DEF delivery. In some examples, determining insufficient DEF injector flow occurs while or during a first operating mode, which may be a nominal engine operating mode, or during a second operating mode, which may be a DEF injector cleaning mode; and determining DEF injector flow restoration occurs while or during the second operating mode. In some examples, the method may include determining whether to perform one or more of each of storing the diagnostic code and operating in the second operating mode based on a determination of whether insufficient DEF injector flow is present and a determination of whether DEF injector flow restoration is present. As an example, in response to a determination of insufficient DEF injector flow while or during the first operating mode and further in response to receiving a request from external the vehicle or internal the vehicle, the engine may be transitioned to the second operating mode. As another example, in response to a determination of DEF injector flow restoration while or during the second operating mode, the engine may be transitioned to the first operating mode.

Further, instructions stored in memory may include determining insufficient DEF injector flow and determining DEF injector flow restoration from a duty cycle of activation of a DEF pump while DEF delivery is commanded. As an example, determining insufficient DEF injector flow may include the duty cycle of activation of the DEF pump being less than a first threshold duty cycle, and determining DEF injector flow restoration may include the duty cycle of activation of the DEF pump being greater than a second threshold duty cycle, which may be the same or different than the first threshold duty cycle. Instructions stored in memory may further include, in response to transitioning from the first operating mode to the second operating mode, increasing an idle speed of the engine from a nominal idle speed to a cleaning mode idle speed, sending a signal to an air intake throttle valve to decrease an opening of the air intake throttle valve from a first air intake throttle valve position to a second, further closed air intake throttle valve position, and sending a signal to VGT vanes to decrease an opening of the VGT vanes from a first vane position to a second, further closed vane position. Additionally, instructions stored in memory may further include, in response to transitioning from the second operating mode to the first operating mode, decreasing the idle speed of the engine from the cleaning mode idle speed to the nominal idle speed, sending a signal to the air intake throttle valve to increase the opening of the air intake throttle valve from the second air intake throttle valve position to the first air intake throttle valve position, and sending a signal to the VGT vanes to increase the opening of the VGT vanes from the second vane position to the first vane position.

Thus, as illustrated by examples herein, the method of operating and performing actions responsive to a determination of insufficient DEF injector flow may include operating in the second operating mode (e.g., operating the engine at idle, with the engine idle speed increased to the cleaning mode idle speed, the air intake throttle valve actuated to the second position, and the VGT vanes actuated to the second position), determining whether insufficient DEF injector flow remains present (such as based on the duty cycle of activation of the DEF pump not being greater than the second threshold duty cycle for a minimum duration) and performing actions in response thereto, as well as operating without insufficient DEF injector flow present, determining that insufficient DEF injector flow is not present (such as based on the duty cycle of activation of the DEF pump being greater than a second threshold duty cycle for the minimum duration when the engine is operating in the second operating mode or based on the duty cycle of activation of the DEF pump not being less than the first threshold duty cycle when the engine is operating in the first operating mode), and performing a different action in response thereto. For example, operating with insufficient DEF injector flow present may include setting a diagnostic code and disabling DEF delivery such that the DEF injector may not be actuated open and the DEF pump may not be activated to deliver DEF to an exhaust passage upstream of a SCR catalyst. As another example, operating without insufficient DEF injector flow present may include enabling DEF delivery such that the DEF injector may be actuated open and the DEF pump may be activated to deliver DEF to the exhaust passage upstream of the SCR catalyst at a determined dosing rate.

Next, FIG. 4 shows a prophetic example timeline for cleaning a clogged DEF injector in in a vehicle. The DEF injector may be included in a DEF dosing system in a boosted engine system, such as the engine system shown in FIG. 1, which may further include a variable geometry turbocharger. The DEF injector (e.g., DEF injector 125 of FIG. 1) may be cleaned according to the method of FIG. 2 based on user input (e.g., from a service technician) and programmed instructions of a software application, for example. An indication of a clogged (e.g., degraded) DEF injector is shown in plot 402, engine speed is shown in plot 404, an air intake throttle valve position is shown in plot 406, VGT vane position is shown in plot 408, exhaust temperature is shown in plot 410, DEF temperature is shown in plot 412, DEF pump duty cycle percentage is shown in plot 414, DEF pump direction is shown in plot 416, and an indication of DEF injector flow restoration is shown in plot 418. For all of the above, the horizontal axis represents time, with time increasing along the horizontal axis from left to right. The vertical axis represents each labeled parameter. For plots 404, 410, 412, and 414, the value of each labeled parameter increases from bottom to top. For plots 402 and 418, the vertical axis represents whether a clogged DEF injector or DEF injector flow restoration is indicated ("yes" or "no"), respectively. For plots 406 and 408, the vertical axis represents a position of the air intake throttle valve and the VGT vanes, respectively, with the position ranging from "closed" (e.g., fully closed) to "open" (e.g., fully open). For plot 416, the vertical access represents a pumping direction of the DEF pump, with "forward" referring to pumping DEF from a DEF tank to the DEF injector, and "reverse" referring to pumping the DEF from the DEF injector to the DEF tank. Furthermore, a first threshold exhaust temperature is indicated by dashed line 420, a second threshold exhaust temperature is indicated by dashed line 422, a DEF temperature threshold is indicated by dashed line 424, and a DEF pump duty cycle threshold is indicated by dashed line 426.

Prior to time t1, a clogged DEF injector is indicated, as shown in plot 402. For example, a corresponding DTC may be stored at a controller of the engine system (e.g., controller 12 of FIG. 1), such as in non-transitory memory. The clogged DEF injector may have been detected according to the method of FIG. 3, for example, while operating the engine in a first mode. Prior to time t1, the engine (e.g., engine 10 of FIG. 1) is on and operating at idle speed (plot 404), such as between 600 and 1000 RPM. The air intake throttle valve (e.g., air intake throttle valve 62 of FIG. 1) is partially open at a first air intake throttle valve position (plot 406), and the VGT vanes (e.g., VGT vanes 165 of FIG. 1) are fully open at a first VGT vane position (plot 408). Exhaust temperature (plot 410) is below both the first threshold exhaust temperature (dashed line 420) and the second threshold exhaust temperature (dashed line 422). The DEF temperature (plot 412), such as measured by a temperature sensor coupled to the DEF tank (e.g., temperature sensor 133 of FIG. 1), is above the DEF temperature threshold (dashed line 426), which may be the DEF freezing point, for example. Therefore, the DEF is not frozen. Furthermore, the DEF pump (e.g., DEF pump 127 of FIG. 1) is not activated, with a duty cycle of 0% (plot 414).

At time t1, DEF injector circuit DTCs are cleared by the service technician, and so a clogged DEF injector is no longer indicated (plot 402). However, DEF injector flow has not yet been restored, as indicated by plot 418. With the DTCs cleared, the engine is transitioned to operating in a DEF injector cleaning mode (e.g., a second mode) by increasing the engine idle speed (plot 404) to a calibrated high idle speed value, such as 1500 RPM. The air intake throttle valve is further closed to a second air intake throttle valve position (e.g., to 80% of the fully closed position), as shown in plot 406, and the VGT vanes are further closed to a second VGT vane position (e.g., to 80% of the fully closed position), as shown in plot 408. As a result of the increased engine speed, a decreased intake airflow, an increased boost pressure generated by the VGT, and an increased exhaust backpressure generated by the partially closed VGT vanes, the exhaust temperature (plot 410) begins to increase, and at time t2, surpasses the first threshold exhaust temperature (dashed line 420). Surpassing the first threshold exhaust temperature may indicate that a SCR catalyst is hot enough to avoid degradation during the DEF injector cleaning process, as described with respect to FIG. 2. Thus, in response to the exhaust temperature surpassing the first threshold exhaust temperature at time t2, the DEF pump is activated (plot 414) in the forward direction (plot 416) to pump DEF from the DEF tank to the DEF injector at a desired flow rate and delivery pressure, for example. Further, at time t2, a DEF dosing timer is started, with a duration of the timer indicated by d1, and the DEF pump duty cycle is monitored (e.g., by the controller).

At time t3, in response to the DEF pump duty cycle (plot 414) increasing above the DEF pump duty cycle threshold (dashed line 426), a second timer is started, with a duration of the second timer indicated by d2. The duration d2 refers to a minimum duration for the DEF pump duty cycle to be maintained above the DEF pump duty cycle threshold to indicate DEF injector flow restoration. For example, above the DEF pump duty cycle threshold, the DEF pump may be operating in a nominal range for providing DEF to an unclogged injector. However, between time t3 and time t4, the DEF pump duty cycle (plot 414) decreases below the DEF pump duty cycle threshold (dashed line 426) before the second timer has elapsed (e.g., before the minimum duration d2 has elapsed). Therefore, DEF injector flow restoration is not indicated (plot 418). Because the exhaust temperature (plot 410) remains above the second threshold exhaust temperature (dashed line 422) and the DEF dosing timer has not elapsed, DEF continues to be delivered, with the DEF pump active. Remaining above the second threshold exhaust temperature ensures that SCR catalyst degradation due to urea poisoning is avoided, for example.

At time t4, the DEF pump duty cycle (plot 414) again surpasses the DEF pump duty cycle threshold (dashed line 426). As a result, the second timer is restarted at time t4. However, between time t4 and time t5, the DEF pump duty cycle (plot 414) again decreases below the DEF pump duty cycle threshold (dashed line 426) before the second timer has elapsed. Therefore, DEF injector flow restoration is not indicated (plot 418). As before, because the exhaust temperature (plot 410) remains above the second threshold exhaust temperature (dashed line 422) and the DEF dosing timer has not elapsed, DEF delivery continues.

At time t5, the DEF pump duty cycle (plot 414) surpasses the DEF pump duty cycle threshold (dashed line 426) for a third time, and the second timer is restarted. The DEF pump duty cycle remains above the DEF pump duty cycle threshold for the entire minimum duration d2. As a result, when the minimum duration d2 elapses at time t6, DEF injector flow restoration is indicated (plot 418). Furthermore, the DEF dosing system is emptied, such as through a purge cycle wherein activation of a reverting valve of the DEF pump reverses a pumping direction of the DEF pump (plot 416). Also at time t6, with the DEF injector cleaning complete, the engine speed (plot 404) is reduced to the starting engine idle speed (e.g., nominal idle speed), the air intake throttle valve is returned to the first air intake throttle valve position (plot 406), and VGT vanes (plot 408) are returned to the first VGT vane position. As a result, the exhaust temperature (plot 410) begins to decrease. The DEF temperature also decreases (plot 412) as the exhaust temperature decreases.

If instead, the DEF pump duty cycle did not remain above the DEF pump duty cycle threshold (dashed line 426) for the minimum duration d2 by the time the DEF dosing timer duration d1 elapsed at t7, such as shown by dashed segment 414a, DEF injector flow restoration would not be indicated, as shown by dashed segment 418a. Furthermore, if the DEF injector cleaning routine had been attempted a threshold number of times (e.g., the DEF dosing timer duration d1 had elapsed the threshold number of times without the DEF pump duty cycle remaining above the DEF pump duty cycle threshold for the minimum duration d2), a clogged DEF injector may be indicated, as shown by dashed segment 402a. With cleaning unsuccessful, the service technician may be alerted to remove the clogged DEF injector for further cleaning or replacement, for example. Otherwise, if the DEF injector cleaning routine had not been attempted four times, the engine may continue to be operated at the high idle speed with the air intake throttle valve at the second air intake throttle valve position and VGT vanes at the second VGT vane position.

At time t8, the purge cycle is finished, and so the reverting valve is de-energized to restore the DEF pump to the forward direction (plot 416). As such, the DEF dosing system may be primed with fresh DEF before the DEF pump is deactivated (e.g., the duty cycle is 0%). By priming the DEF dosing system, any remaining urea crystals may be dissolved, and further crystal growth (e.g., through evaporation of any remaining DEF in the DEF dosing system after purging) may be prevented.

In this way, the DEF dosing system may be cleaned from the DEF pump to the DEF injector outlet. The cleaning routine may be performed a threshold number of times before insufficient injector flow is indicated, which increases the likelihood that the DEF injector may be cleaned compared with performing the routine fewer than the threshold number of times. Furthermore, limiting the routine to the threshold number of attempts may prevent excess wear to components of the DEF dosing system (e.g., the DEF pump), as additional attempts (e.g., more than the threshold number) may be unlikely to result in successful flow restoration if DEF flow has not been restored after the threshold number of attempts. Further, setting a degraded (e.g., clogged) DEF injector DTC may be avoided if applying vacuum to the DEF dosing system through activating a purge cycle is able to clear a clog while the vehicle is being driven.

The technical effect of performing the cleaning routine is to dislodge urea crystals from the DEF injector by delivering DEF at a high pressure.

As one example, a method comprises: while delivering diesel exhaust fluid (DEF) from a DEF dosing system to an exhaust passage of an engine via a DEF injector, indicating insufficient DEF injector flow in response to a duty cycle of a DEF pump being less than a first threshold duty cycle; and operating the engine in a DEF injector cleaning mode in response to the indication. In the preceding example, additionally or optionally, the indicating insufficient DEF injector flow is further in response to the duty cycle of the DEF pump remaining less than the first threshold duty cycle after activating a purge cycle a threshold number of times. In any or all of the preceding examples, additionally or optionally, activating the purge cycle includes actuating the DEF injector to an open position and activating the DEF pump with a reverting valve commanded for a predetermined duration. In any or all of the preceding examples, additionally or optionally, the DEF injector cleaning mode includes operating the engine at idle. In any or all of the preceding examples, additionally or optionally, the DEF injector cleaning mode further includes increasing an idle speed of the engine to a predetermined idle speed that is higher than when operating the engine at idle outside of the DEF injector cleaning mode, actuating an intake throttle valve to an intake throttle valve position that is less open than when operating the engine at idle outside of the DEF injector cleaning mode, and actuating vanes of a variable geometry turbine (VGT) to a vane position that is less open than when operating the engine at idle outside of the DEF injector cleaning mode. In any or all of the preceding examples, the DEF injector cleaning mode additionally or optionally further comprises: responsive to an exhaust temperature exceeding a first threshold exhaust temperature and a temperature of the DEF being greater than a threshold temperature, commanding the DEF pump to deliver a desired amount of DEF to the DEF injector via a DEF line at a desired flowrate; setting a dosing timer for a first duration; measuring the duty cycle of the DEF pump; indicating DEF injector flow restoration responsive to the duty cycle of the DEF pump being greater than a second threshold duty cycle for a second duration, less than the first duration; discontinuing DEF delivery and emptying the DEF line responsive to the duty cycle of the DEF pump being greater than the second threshold duty cycle for the second duration; discontinuing DEF delivery and emptying the DEF line responsive to the duty cycle of the DEF pump not being greater than the second threshold duty cycle for the second duration before the first duration elapses; discontinuing DEF delivery and emptying the DEF line responsive to the exhaust temperature falling below a second threshold exhaust temperature, lower than the first threshold exhaust temperature; and indicating insufficient DEF injector flow after emptying the DEF line a threshold number of times during the DEF injector cleaning mode. In any or all of the preceding examples, additionally or optionally, the first threshold duration is more than 60 seconds and the second threshold duration is more than 15 seconds. In any or all of the preceding examples, additionally or optionally, emptying the DEF line includes actuating the DEF injector to an open position and activating the DEF pump with a reverting valve commanded for a duration.

As another example, a vehicle method comprises: setting a diagnostic code stored in non-transitory memory indicating a degraded DEF injector; receiving a request from external the vehicle or internal to the vehicle to operate in a DEF injector cleaning mode; and responsive to receiving the request and the diagnostic code being cleared, performing the cleaning mode, including operating the engine at a cleaning idle speed that is greater than an engine idle speed outside the cleaning mode. In the preceding example, additionally or optionally, the cleaning mode further includes decreasing an amount of intake air while operating at the cleaning idle speed from an amount of intake air at idle speed outside the cleaning mode for an equivalent ambient temperature and engine temperature. In any or all of the preceding examples, additionally or optionally, an air intake throttle valve position is less open than an open position of the air intake throttle valve during the engine idle outside of the cleaning mode. In any or all of the preceding examples, additionally or optionally, an amount of cleaning mode turbocharger boost is greater than at idle speed outside the cleaning mode for the equivalent ambient temperature and engine temperature, and a VGT vane position is less open than during the engine idle outside of the cleaning mode. In any or all of the preceding examples, additionally or optionally, transmission shifting is prevented during the cleaning mode, even if requested by a vehicle operator, due to an impact of the cleaning idle speed on the transmission. In any or all of the preceding examples, the method additionally or optionally further comprises, during the cleaning mode, responsive to an exhaust temperature exceeding a first, higher threshold exhaust temperature, commanding a DEF pump to deliver a desired amount of DEF to the DEF injector at a target delivery pressure; measuring a duty cycle of DEF pump activation; and indicating DEF injector flow restoration responsive to the DEF pump duty cycle being greater than a threshold duty cycle and maintained for a first, shorter duration. In any or all of the preceding examples, the method additionally or optionally further comprises, during the cleaning mode, discontinuing DEF delivery and emptying a DEF line responsive to the DEF pump duty cycle being greater than the threshold duty cycle and maintained for the first duration; discontinuing DEF delivery and emptying the DEF line responsive to the DEF pump duty cycle not being greater than the threshold duty cycle and maintained for the first duration within a second, longer duration; and discontinuing DEF delivery and emptying the DEF line responsive to the exhaust temperature falling below a second, lower threshold exhaust temperature. In any or all of the preceding examples, the method additionally or optionally further comprises, during the cleaning mode, indicating insufficient DEF injector flow by at least one of setting another diagnostic code and generating a display message responsive to the DEF pump duty cycle not being greater than the threshold duty cycle and maintained for the first duration within the second duration after a threshold number of cleaning attempts.

As a third example, a vehicle system comprises: an engine configured to combust a mixture of diesel fuel and air within a plurality of cylinders; an intake throttle valve coupled to an intake passage of the engine; an emission control device coupled to an exhaust passage of the engine, including a selective catalytic reduction (SCR) catalyst, a nitrogen oxide sensor, and a diesel particulate filter; a diesel exhaust fluid (DEF) delivery system, including a DEF tank holding DEF, a DEF pump for supplying the DEF from the DEF tank to a DEF injector via a DEF line, a pressure sensor coupled to the DEF line, and a temperature sensor coupled to the DEF tank; a turbocharger, including a variable geometry turbine (VGT) coupled to the exhaust passage upstream of the emission control device and a compressor coupled to an intake manifold of the engine; a temperature sensor coupled to the exhaust passage; and a controller storing instructions in non-transitory memory that, when executed, cause the controller to: operate in a first mode to deliver the DEF to the exhaust passage upstream of the SCR catalyst in response to at least one of an amount of ammonia stored in the SCR catalyst being less than a threshold amount, a speed of the engine being greater than a threshold speed, and a concentration of nitrogen oxides being greater than a threshold concentration; and operate in a second mode in response to at least one of a diagnostic code stored in non-transitory memory indicating a degraded DEF injector and receiving a request to operate in the second mode from external the vehicle. In the preceding example, additionally or optionally, delivering the DEF to the exhaust passage upstream of the SCR catalyst includes actuating the DEF pump and the DEF injector to provide DEF at a determined dosing rate, and the diagnostic code stored in non-transitory memory indicating the degraded DEF injector is set in response to a DEF pump duty cycle decreasing below a threshold duty cycle while operating in the first mode and delivering the DEF. In any or all of the preceding examples, additionally or optionally, the second mode is a DEF injector cleaning mode, the DEF injector cleaning mode comprising: operating the engine at idle, with the intake throttle valve at a first intake throttle valve position and vanes of the VGT at a first vane position; increasing an idle speed of the engine, actuating the intake throttle valve to a second intake throttle valve position that is further closed than the first intake throttle valve position, and actuating the VGT vanes to a second vane position that is further closed than the first vane position in response to receiving clearance of the diagnostic code stored in non-transitory memory indicating the degraded DEF injector; commanding the DEF pump and the DEF injector to deliver a desired amount of DEF at a desired flow rate and setting a dosing timer in response to an exhaust temperature exceeding a first threshold exhaust temperature and a DEF temperature that is greater than a threshold DEF temperature; monitoring a duty cycle of the DEF pump; stopping DEF delivery and activating a purge cycle in response to the duty cycle of the DEF pump being maintained above a threshold duty cycle for a minimum duration, the dosing timer elapsing without the duty cycle of the DEF pump being maintained above the threshold duty cycle for the minimum duration, or the exhaust temperature falling below a second threshold exhaust temperature, which is less than the first threshold exhaust temperature. In any or all of the preceding examples, additionally or optionally, the controller stores further instructions in non-transitory memory that, when executed, cause the controller to: indicate DEF flow restoration when the purge cycle is activated in response to the duty cycle of the DEF pump being maintained above the threshold duty cycle for the minimum duration; command the DEF pump and the DEF injector to deliver the desired amount of DEF at the desired flow rate and reset the dosing timer in response to the exhaust temperature being greater than the first threshold exhaust temperature and the DEF temperature being greater than the threshold DEF temperature when the purge cycle is activated in response to the dosing timer elapsing without the duty cycle of the DEF pump being maintained above the threshold duty cycle for the minimum duration or the exhaust temperature falling below the second threshold exhaust temperature and further when a number of times the dosing timer has elapsed is less than a threshold number; and set a diagnostic code in non-transitory memory indicating a degraded DEF injector when the purge cycle is activated in response to the dosing timer elapsing without the duty cycle of the DEF pump being maintained above the threshold duty cycle for the minimum duration or the exhaust temperature falling below the second threshold exhaust temperature and further when the number of times the dosing timer has elapsed is not less than the threshold number.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine system, comprising:
while delivering diesel exhaust fluid (DEF) from a DEF dosing system to an exhaust passage of an engine via a DEF injector, indicating insufficient DEF injector flow in response to a duty cycle of a DEF pump being less than a first threshold duty cycle; and
operating the engine in a DEF injector cleaning mode in response to the indication, the DEF injector cleaning mode including operating the engine at idle and increasing an idle speed of the engine to an idle speed that is higher than when operating the engine at idle outside of the DEF injector cleaning mode.

2. The method of claim 1, wherein the indicating insufficient DEF injector flow is further in response to the duty cycle of the DEF pump remaining less than the first threshold duty cycle after activating a purge cycle a threshold number of times.

3. The method of claim 2, wherein activating the purge cycle includes actuating the DEF injector to an open position and activating the DEF pump with a reverting valve commanded for a predetermined duration.

4. The method of claim 1, wherein the DEF injector cleaning mode further includes actuating an intake throttle valve to an intake throttle valve position that is less open than when operating the engine at idle outside of the DEF injector cleaning mode, and actuating vanes of a variable geometry turbine (VGT) to a vane position that is less open than when operating the engine at idle outside of the DEF injector cleaning mode.

5. The method of claim 4, wherein the DEF injector cleaning mode further comprises:
responsive to an exhaust temperature exceeding a first threshold exhaust temperature and a temperature of the DEF being greater than a threshold temperature, commanding the DEF pump to deliver a desired amount of DEF to the DEF injector via a DEF line at a desired flowrate;

setting a dosing timer for a first duration;
measuring the duty cycle of the DEF pump;
indicating DEF injector flow restoration responsive to the duty cycle of the DEF pump being greater than a second threshold duty cycle for a second duration, less than the first duration;
discontinuing DEF delivery and emptying the DEF line responsive to the duty cycle of the DEF pump being greater than the second threshold duty cycle for the second duration;
discontinuing DEF delivery and emptying the DEF line responsive to the duty cycle of the DEF pump not being greater than the second threshold duty cycle for the second duration before the first duration elapses;
discontinuing DEF delivery and emptying the DEF line responsive to the exhaust temperature falling below a second threshold exhaust temperature, lower than the first threshold exhaust temperature; and
indicating insufficient DEF injector flow after emptying the DEF line a threshold number of times during the DEF injector cleaning mode.

6. The method of claim 5, wherein the first threshold duration is more than 60 seconds and the second threshold duration is more than 15 seconds.

7. The method of claim 5, wherein emptying the DEF line includes actuating the DEF injector to an open position and activating the DEF pump with a reverting valve commanded for a duration.

8. A vehicle method, comprising:
setting a diagnostic code stored in non-transitory memory indicating a degraded DEF injector;
receiving a request from external a vehicle or internal to the vehicle to operate in a DEF injector cleaning mode; and
responsive to receiving the request and the diagnostic code being cleared, performing the DEF injector cleaning mode, including operating an engine at a cleaning idle speed that is greater than an engine idle speed outside the cleaning mode.

9. The method of claim 8, wherein the cleaning mode further includes decreasing an amount of intake air while operating at the cleaning idle speed from an amount of intake air at idle speed outside the cleaning mode for an equivalent ambient temperature and engine temperature.

10. The method of claim 9, wherein an air intake throttle valve position is less open than an open position of the air intake throttle valve during engine idle outside of the DEF injection cleaning mode.

11. The method of claim 9, wherein an amount of cleaning mode turbocharger boost is greater than at idle speed outside the cleaning mode for the equivalent ambient temperature and engine temperature, and a VGT vane position is less open than during the engine idle outside of the cleaning mode.

12. The method of claim 8, wherein transmission shifting is prevented during the DEF injector cleaning mode, even if requested by a vehicle operator, due to an impact of the cleaning idle speed on a transmission.

13. The method of claim 8, further comprising:
during the DEF injector cleaning mode,
responsive to an exhaust temperature exceeding a first, higher threshold exhaust temperature, commanding a DEF pump to deliver a desired amount of DEF to the DEF injector at a target delivery pressure;
measuring a duty cycle of DEF pump activation; and
indicating DEF injector flow restoration responsive to the DEF pump duty cycle being greater than a threshold duty cycle and maintained for a first, shorter duration.

14. The method of claim 13, further comprising:
during the DEF injector cleaning mode,
discontinuing DEF delivery and emptying a DEF line responsive to the DEF pump duty cycle being greater than the threshold duty cycle and maintained for the first duration;
discontinuing DEF delivery and emptying the DEF line responsive to the DEF pump duty cycle not being greater than the threshold duty cycle and maintained for the first duration within a second, longer duration; and
discontinuing DEF delivery and emptying the DEF line responsive to the exhaust temperature falling below a second, lower threshold exhaust temperature.

15. The method of claim 14, further comprising, during the DEF injector cleaning mode, indicating insufficient DEF injector flow by at least one of setting another diagnostic code and generating a display message responsive to the DEF pump duty cycle not being greater than the threshold duty cycle and maintained for the first duration within the second duration after a threshold number of cleaning attempts.

16. A vehicle system, comprising:
an engine configured to combust a mixture of diesel fuel and air within a plurality of cylinders;
an intake throttle valve coupled to an intake passage of the engine;
an emission control device coupled to an exhaust passage of the engine, including a selective catalytic reduction (SCR) catalyst, a nitrogen oxide sensor, and a diesel particulate filter;
a diesel exhaust fluid (DEF) delivery system, including a DEF tank holding DEF, a DEF pump for supplying the DEF from the DEF tank to a DEF injector via a DEF line, a pressure sensor coupled to the DEF line, and a temperature sensor coupled to the DEF tank;
a turbocharger, including a variable geometry turbine (VGT) coupled to the exhaust passage upstream of the emission control device and a compressor coupled to an intake manifold of the engine;
a temperature sensor coupled to the exhaust passage; and
a controller storing instructions in non-transitory memory that, when executed, cause the controller to:
operate in a first mode to deliver the DEF to the exhaust passage upstream of the SCR catalyst in response to at least one of an amount of ammonia stored in the SCR catalyst being less than a threshold amount, a speed of the engine being greater than a threshold speed, and a concentration of nitrogen oxides being greater than a threshold concentration; and
operate in a second mode in response to at least one of a diagnostic code stored in non-transitory memory indicating a degraded DEF injector and receiving a request to operate in the second mode from external a vehicle.

17. The system of claim 16, wherein delivering the DEF to the exhaust passage upstream of the SCR catalyst includes actuating the DEF pump and the DEF injector to provide DEF at a determined dosing rate, and the diagnostic code stored in non-transitory memory indicating the degraded DEF injector is set in response to a DEF pump duty cycle decreasing below a threshold duty cycle while operating in the first mode and delivering the DEF.

18. The system of claim 16, wherein the second mode is a DEF injector cleaning mode, the DEF injector cleaning mode comprising:
- operating the engine at idle, with the intake throttle valve at a first intake throttle valve position and vanes of the VGT at a first vane position;
- increasing an idle speed of the engine, actuating the intake throttle valve to a second intake throttle valve position that is further closed than the first intake throttle valve position, and actuating the VGT vanes to a second vane position that is further closed than the first vane position in response to receiving clearance of the diagnostic code stored in non-transitory memory indicating the degraded DEF injector;
- commanding the DEF pump and the DEF injector to deliver a desired amount of DEF at a desired flow rate and setting a dosing timer in response to an exhaust temperature exceeding a first threshold exhaust temperature and a DEF temperature that is greater than a threshold DEF temperature;
- monitoring a duty cycle of the DEF pump; and
- stopping DEF delivery and activating a purge cycle in response to the duty cycle of the DEF pump being maintained above a threshold duty cycle for a minimum duration, the dosing timer elapsing without the duty cycle of the DEF pump being maintained above the threshold duty cycle for the minimum duration, or the exhaust temperature falling below a second threshold exhaust temperature, which is less than the first threshold exhaust temperature.

19. The system of claim 18, wherein the controller stores further instructions in non-transitory memory that, when executed, cause the controller to:
- indicate DEF flow restoration when the purge cycle is activated in response to the duty cycle of the DEF pump being maintained above the threshold duty cycle for the minimum duration;
- command the DEF pump and the DEF injector to deliver the desired amount of DEF at the desired flow rate and reset the dosing timer in response to the exhaust temperature being greater than the first threshold exhaust temperature and the DEF temperature being greater than the threshold DEF temperature when the purge cycle is activated in response to the dosing timer elapsing without the duty cycle of the DEF pump being maintained above the threshold duty cycle for the minimum duration or the exhaust temperature falling below the second threshold exhaust temperature and further when a number of times the dosing timer has elapsed is less than a threshold number; and
- set a diagnostic code in non-transitory memory indicating a degraded DEF injector when the purge cycle is activated in response to the dosing timer elapsing without the duty cycle of the DEF pump being maintained above the threshold duty cycle for the minimum duration or the exhaust temperature falling below the second threshold exhaust temperature and further when the number of times the dosing timer has elapsed is not less than the threshold number.

* * * * *